Nov. 12, 1935.                C. L. LOHNER                2,020,843
                              MEAT FORMING
                           Filed Feb. 27, 1934

Carl L. Lohner
INVENTOR

WITNESS
BY
ATTORNEY

Patented Nov. 12, 1935

2,020,843

UNITED STATES PATENT OFFICE 2,020,843

MEAT FORMING

Carl Leonard Lohner, Chicago, Ill., assignor to Industrial Patents Corporation, Chicago, Ill., a corporation of Delaware Application February 27, 1934, Serial No. 713,168

1 Claim. (Cl. 99—14)

This application is a continuation in part of my application entitled Meat forming and product thereof, Serial No. 633,352, filed September 15, 1932.

This invention relates to a method of forming meat.

One of the objects of this invention is to provide a method for preparing such meats as pork tenderloins and the like for market.

Other objects of the invention will be apparent from the description and claim which follows.

Referring now to the drawing in which similar reference characters in the several figures refer to the identical parts:

Figure 1:
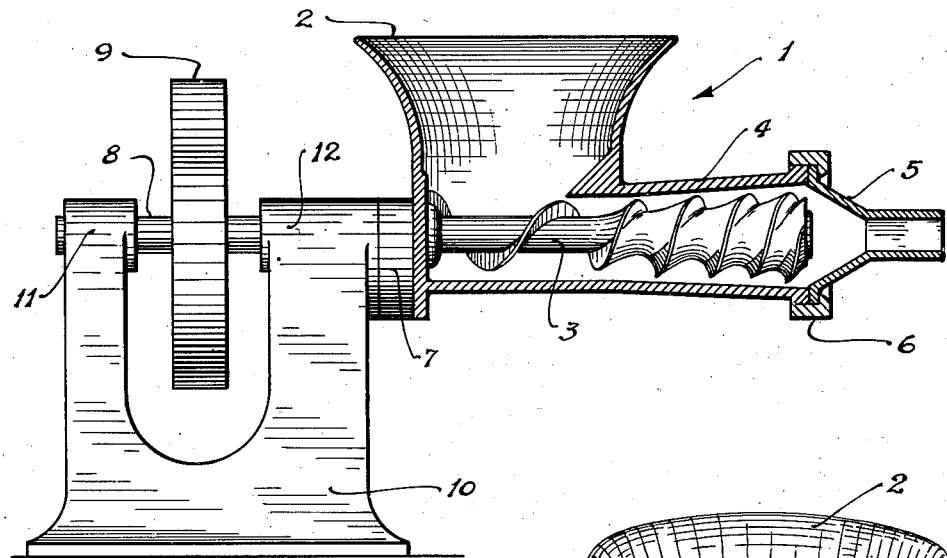
Figure 1 is a side view partly in section of a wall pressure device fitted with an extrusion die.
Figure 2:
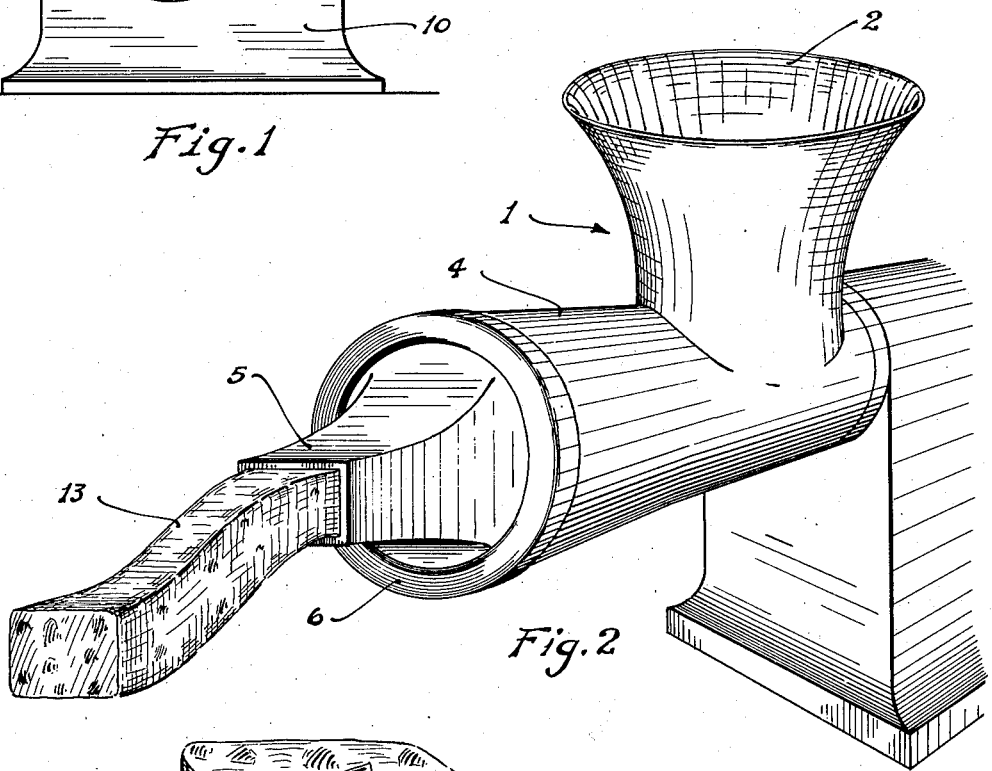
Figure 2 is a perspective view of the device shown in Figure 1, showing a ribbon of meat being extruded through the die.

Referring now more particularly to Figure 1:

The conventional hasher casing 1 is provided with ingress bowl 2 and worm 3. Worm 3 receives product in the bowl 2, passes it through tube 4 and through die 5, which may be affixed to the end of tube 4 by ring 6. Worm 3 is journaled at 7 and driven by power applied through shaft 8, which may be rotated by the action of a belt or worm 9 rigidly affixed to shaft 8. Shaft 8 is journaled in frame 9 at 11 and 12.

In the practice of the present invention, fresh tenderloins, frenched on the sides, are cut into fairly large pieces, and conditioned for forming by freezing. Conditioning the meat for forming by freezing the meat to a point at which it may be easily handled in the apparatus is important. In the first place such conditioning assures that the ribbon of meat coming from the extrusion device will retain the shape desired. In the second place, it exercises a distinct control on the degree of intermixture of fat and lean constituents or breaking down of tissue fibers.

Figure 3:
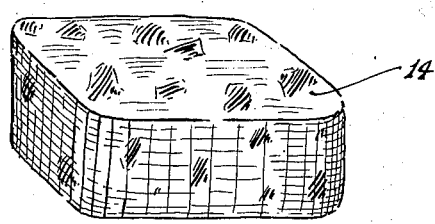
Figure 3 is a perspective view of the product of the present invention.

The product is placed in the bowl 2 and forced through extrusion die 5, from whence it comes in the form of a ribbon 13. For practical purposes, the product is extruded in any desired form, being about two inches in the greatest cross-sectional dimension. The product is then placed on trays in the form of a ribbon and conditioned briefly in a freezer, and thereafter sliced into one-half inch patties 14 as shown in Figure 3.

The action of the worm employed in the extrusion die, although it does not comminute the pieces of tenderloin, does afford an intermixture of fat and lean meat and to some extent breaks down the fibers of the tenderloin, producing a more tender product than is produced by conventional means in the preparation of tenderloin patties.

It will be understood that changes may be made in the details of the present invention without departing from the spirit thereof as defined in the following claim:

I claim:

The method of treating pork tenderloins which consists in first frenching the tenderloins on the sides, cutting into fairly large pieces, conditioning for forming by freezing, forming the meat into a ribbon, and then slicing the ribbon of meat while frozen into patties uniform in cross section.

CARL LEONARD LOHNER.